United States Patent
Edpalm et al.

(10) Patent No.: US 10,798,418 B2
(45) Date of Patent: Oct. 6, 2020

(54) METHOD AND ENCODER FOR ENCODING A VIDEO STREAM IN A VIDEO CODING FORMAT SUPPORTING AUXILIARY FRAMES

(71) Applicant: Axis AB, Lund (SE)

(72) Inventors: Viktor Edpalm, Lund (SE); Hampus Linse, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/152,041

(22) Filed: Oct. 4, 2018

(65) Prior Publication Data
US 2019/0116382 A1    Apr. 18, 2019

(30) Foreign Application Priority Data
Oct. 18, 2017 (EP) ..................... 17197036

(51) Int. Cl.
| | | |
|---|---|---|
| H04N 19/61 | (2014.01) | |
| H04N 19/139 | (2014.01) | |
| H04N 19/105 | (2014.01) | |
| H04N 19/172 | (2014.01) | |
| H04N 19/517 | (2014.01) | |
| H04N 19/33 | (2014.01) | |
| H04N 5/232 | (2006.01) | |

(Continued)

(52) U.S. Cl.
CPC ......... *H04N 19/61* (2014.11); *H04N 5/23229* (2013.01); *H04N 5/23267* (2013.01); *H04N 5/3572* (2013.01); *H04N 19/105* (2014.11); *H04N 19/139* (2014.11); *H04N 19/172* (2014.11); *H04N 19/33* (2014.11); *H04N 19/517* (2014.11); *H04N 19/85* (2014.11)

(58) Field of Classification Search
CPC ...... H04N 19/33; H04N 19/517; H04N 19/85; H04N 19/61; H04N 5/3572; H04N 19/105; H04N 19/172; H04N 5/23229; H04N 5/23267; H04N 19/139
USPC ...................................... 375/240.1
See application file for complete search history.

(56) References Cited

U.S. PATENT DOCUMENTS

| | | |
|---|---|---|
| 6,072,831 A | 6/2000 | Chen |
| 7,072,397 B2 | 7/2006 | Sriram et al. |
| 8,269,859 B2 | 9/2012 | Taoka |

(Continued)

FOREIGN PATENT DOCUMENTS

| | | |
|---|---|---|
| EP | 1069529 A2 | 1/2001 |
| EP | 1178666 A1 | 2/2002 |

OTHER PUBLICATIONS

Summons to Attend Oral Proceedings Pursuant to Rule 115(1) EPC dated May 6, 2019 for European Patent Application No. 17197036.1.

(Continued)

*Primary Examiner* — Tung T Vo
(74) *Attorney, Agent, or Firm* — Volpe and Koenig, P.C.

(57) ABSTRACT

A method and an encoder for encoding a video stream in a video coding format supporting auxiliary frames which includes receiving first image data captured by a video capturing device, using the first image data as image data of a first auxiliary frame, encoding the first auxiliary frame as an intra frame, and encoding a first frame as an inter frame referencing the first auxiliary frame, wherein motion vectors of the first frame are representing a first image transformation to be applied to the first image data.

20 Claims, 5 Drawing Sheets

(51) Int. Cl.
*H04N 19/85* (2014.01)
*H04N 5/357* (2011.01)

(56) References Cited

U.S. PATENT DOCUMENTS

| | | | |
|---|---|---|---|
| 9,185,271 B2 | 11/2015 | Kawakami et al. | |
| 9,560,353 B2 | 1/2017 | Sugio et al. | |
| 2004/0028132 A1* | 2/2004 | Kadono | H04N 19/105 375/240.12 |
| 2004/0076234 A1* | 4/2004 | Prieto | G06F 17/148 375/240.19 |
| 2004/0190617 A1* | 9/2004 | Shen | H04N 19/159 375/240.16 |
| 2007/0140580 A1 | 6/2007 | Heath et al. | |
| 2010/0036964 A1* | 2/2010 | Cedervall | H04N 7/173 709/231 |
| 2011/0228848 A1* | 9/2011 | Dvir | H04N 19/172 375/240.12 |
| 2011/0298942 A1* | 12/2011 | Uchida | H04N 5/232 348/222.1 |
| 2014/0321545 A1* | 10/2014 | Wang | H04N 19/577 375/240.15 |
| 2015/0271356 A1* | 9/2015 | Terada | H04N 19/50 348/231.99 |
| 2017/0013233 A1* | 1/2017 | Kuusela | H04N 19/44 |
| 2017/0034519 A1 | 2/2017 | Rosewarne | |
| 2018/0130022 A1* | 5/2018 | Ayoub | H04L 51/02 |
| 2018/0310022 A1* | 10/2018 | Edpalm | H04N 19/176 |
| 2018/0352229 A1* | 12/2018 | Araki | H04N 19/124 |
| 2019/0082193 A1* | 3/2019 | Sun | H04N 19/176 |
| 2019/0191105 A1* | 6/2019 | Yuan | H04N 19/23 |
| 2020/0007883 A1* | 1/2020 | Toresson | H04N 19/107 |

OTHER PUBLICATIONS

Altunbasak et al., "A fast parametric motion estimation algorithm with illumination and lens distortion correction," in IEEE Transactions on Image Processing, vol. 12, No. 4, pp. 395-408, (Apr. 2003).

Hwang et al., "Correction of Lens Distortion Using Point Correspondence", Tencon 99, Proceedings of the IEEE Region 10 Conference, Cheju Island, South Korea, Sep. 15, 1999, vol. 1, pp. 690-693.

Weng et al., "Camera Calibration with Distortion Models and Accuracy Evaluation", IEEE Transactions on Pattern Analysis and Machine Intelligence, IEEE Computer Society, USA, Oct. 1, 1992, vol. 14, No. 10, pp. 965-980.

Boyce et al., "Overview of SHVC: Scalable Extension of the High Efficiency Video Coding Standard", IEEE Transactions on Circuits and Systems for Video Technology, Institute of Electrical and Electronics Engineers, USA, Jan. 1, 2016, vol. 26, No. 1, pp. 20-34.

European Search Report for European Patent Application No. 21092894; dated Apr. 26, 2018.

* cited by examiner

METHOD AND ENCODER FOR ENCODING A VIDEO STREAM IN A VIDEO CODING FORMAT SUPPORTING AUXILIARY FRAMES

TECHNICAL FIELD

The present invention relates to the field of video encoding. In particular, it relates to a method and an encoder for encoding a video stream in a video coding format supporting auxiliary frames.

BACKGROUND

Video capturing devices, or video cameras, are used for capturing a stream of digital images, or frames, which may be encoded and decoded before being transferred to a display to be shown or to be further processed by e.g. a software. Due to imperfections or limitations of the optical system of the video capturing device, the decoded digital images may show geometrical distortions. Another example of an undesired distortion may be caused by vibrations of the video capturing device. These types of distortions may be disadvantageous in a surveillance situation where the quality of the operator's work or output from a video analytics software may depend on the quality of the decoded video stream.

Today, many surveillance systems allow for complex transformations of the digital images in the captured video stream before encoding the video stream. Examples of such complex transformations include stitching, dewarping, Digital Pan Tilt Zoom (DPTZ), electrical image stabilization (EIS), barrel distortion correction (BDC), etc. These transformations require special hardware and are a heavy load on the surveillance system resources such as memory bandwidth. As a side effect, these transformations may remove parts of the original field of view of the captured digital images, as well as distorting parts of the digital images.

There is thus a need for improvements within this context.

SUMMARY

There is a need to overcome, or at least mitigate, the problems discussed above. In particular, it would be advantageous to provide an encoding method and an encoder which reduces the load on the resources of the video capturing system when complex transformations of the captured frames of a video stream are required and which facilitate retrieval of the originally captured image data.

According to a first aspect, a method for encoding a video stream in a video coding format includes a video coding format which supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the method comprising the steps of:

receiving first image data captured by a video capturing device, using the first image data as image data of a first auxiliary frame, encoding the first auxiliary frame as an intra frame, and encoding a first frame as an inter frame referencing the first auxiliary frame, wherein motion vectors of the first frame are representing a first image transformation to be applied to the first image data.

By an auxiliary frame is generally meant storage of an image data which complements another frame (also known as a master image) in the encoded video stream. In other words, said another frame references the auxiliary frame. The auxiliary frame can be used in various forms to assist in displaying the frame it complements but is not typically displayed as such. The auxiliary frame may also be referred to as auxiliary image, auxiliary image item, non-displayed frame, auxiliary picture etc. Known applications of an auxiliary frame includes using it for an alpha plane or a depth map.

The first frame (and below the second, third etc.) may thus also be called master image or master frame.

By "motion vectors of the first frame are representing a first image transformation to be applied to the first image data" (and similar expressions for second, third frames etc.) is generally meant that the motion vectors sample the image transform for certain coordinates in the typically continuous image transform. The sampling coordinates are typically determined by the macroblock size(s) used for the first frame as will be explained further below.

Within for example the H.265 encoding standard (and other newer encoding standards such as Google's VP10), a frame can be tagged as "no-display", meaning that the frame is not to be displayed to the user. In H.265 for example, the tagging can be done by setting the pic_output_flag in the slice header to false or setting the no_display flag in the SEI header to true.

The inventors have realized that such auxiliary frames, in conjunction with the frames that references the auxiliary frames, can be used to for storing data relating to complex image transformations, in addition to normal encoding/compression data, to provide an efficient encoding of a video stream where complex image transformations on the raw image data (as captured by the video capturing device) are required. With the present embodiment, the raw image data need not to be preprocessed (e.g. for barrel distortion correction or similar) before the encoding process starts which reduces the load on the resources of e.g. the video capturing device, and removes the need of a hardware or software performing such a preprocessing step.

The present embodiment may further be advantageous in that the encoded video stream can be decoded by a standard video stream decoder that supports the video coding format used by the encoder since the above method follows the standard of such video coding format. A further advantage may be that since the image data of the auxiliary frame is the raw image data captured by the video capturing device, this data is included in the encoded video stream and can later be retrieved by a custom decoder if needed.

According to some embodiments, the method further comprising the steps of: receiving second image data captured by the video capturing device, encoding the second auxiliary frame as an inter frame referencing the first auxiliary frame, wherein the encoding of the second auxiliary frame is made based on comparisons between the second image data and the first image data, and encoding a second frame as an inter frame referencing the second auxiliary frame, wherein motion vectors of the second frame are representing a second image transformation to be applied to the second image data.

Some video compression standards, such as the video encoding formats described herein, prescribe temporal video compression implemented in terms of intra frames, e.g. I-frames, and inter frames, e.g. P-frames or B-frames. An intra-frame is basically an image frame that is encoded using only the information in the image frame to be encoded. Moreover, the intra-frame is calculated from all image data captured for the image frame to be encoded. Therefore, the intra-frame sometimes is referred to as a full frame. The inter-frames, also referred to as predictive frames or as differential frames, are based on information from previously (and optionally later) encoded image frames as well as the information of the presently encoded frame, i.e. the inter-frame may be described as taking advantage of temporally redundant information in previous (and optionally later) image frames. The encoder implementing this type of codecs (compression standards) typically generates an intra-frame followed by a predetermined number of inter-frames and then a new intra-frame followed by the same number of inter-frames. The length of this sequence of an intra-frame followed by a number of inter-frames is often referred to as Group of Pictures length (GOP-length). For some compression standards, e.g. H.265, the GOP-length can be adjusted during encoding.

With the present embodiment, the encoding of the second auxiliary frame takes advantage of temporal video compression. The encoding of the second auxiliary frame thus takes advantage of temporally redundant information in the previous, first, auxiliary frame. The encoded second auxiliary frame may thus contain both motion vector displacements of the second image data in relationship to image data of the first auxiliary frame (i.e. first image data) and image data describing image content not present in the first auxiliary frame and predictions error (also referred to residual values).

It should be noted that the above disclosed embodiment may be carried out in an iterative manner, meaning that it may be repeated for third, fourth etc. image data captured by the video capturing device according to the defined GOP-length. After this, a new sequence of an intra-frame followed by a number of inter-frames may be started, as understood by the skilled person.

According to some embodiments, the second image transformation equals the first image transformation. This embodiment may be advantageous when encoding the second frame, in that the motion vectors of the second frame may be equal to the motion vectors of the first frame and thus do not need to be determined/calculated again. Consequently, the complexity of the encoding process may be reduced. For example, in some embodiments, the step of encoding the second frame comprises copying the first frame and referencing the copy of the first frame to the second auxiliary frame. In other embodiments, the motion vectors of the first frame are copied and used as motion vectors of the second frame. In yet another embodiment, wherein the motion vectors of the first and second frame are pre-calculated, the step of encoding the first and second frame, respectively, comprises retrieving (e.g. from a memory of the encoder or a memory of a device connected to the encoder) the pre-calculated motion vectors. Since the first and second image transformation are equal, (e.g. due to a constant lens distortion of the video recording device) the motion vectors for a specific video recording device may be pre-calculated and used for all image data recorded by it.

According to some embodiments, the first and second image transformation at least partly neutralize distortion of the first and second image data caused by a lens of the video recording device. Examples of such distortion may be barrel distortion, pincushion distortion, mustache distortion, and distortion caused by a wide-angle lens of the video recording device. In this embodiment, the first and second image transformation typically are equal, but small differences may occur e.g. due to irregularities in the functionality of the image sensor of the video capturing device. In some embodiments, such irregularities are disregarded and it is assumed that the first and second image transformation are equal.

According to some embodiments, the second image transformation differs from the first image transformation. This increases the flexibility of the encoding method.

According to some embodiments, the first and second image transformations relate to one from the list of: electronic image stabilization (EIS), and Digital Pan Tilt Zoom (DPTZ).

According to some embodiments, the step of encoding the first frame comprises the steps of: determining a first image transformation to be applied to the first image data, and calculating motion vectors representing the first image transformation by sampling the first image transformation according to a determined macroblock size for the motion vectors of the first frame. This embodiment may of course also be applied to the second, third, etc. frame. In this embodiment, the image transformation is sampled in a uniform way over the entire image area which may reduce the complexity of the sampling process.

According to some embodiments, the step of encoding the first frame comprises the steps of: determining a first image transformation to be applied to the first image data, and calculating motion vectors representing the first image transformation by sampling the first image transformation according to a determined plurality of macroblock sizes for the motion vectors of the first frame. This embodiment may of course also be applied to the second, third, etc. frame. In this embodiment, the image transformation is sampled in a non-uniform way over the entire image area which may increase the flexibility and adaptability (based on e.g. properties of the image transformation) of the sampling process.

According to some embodiments, the video coding format is one of the list of: High Efficiency Image File Format, Advanced Video Coding, H.264, High Efficiency Video Coding, H.265, H.266, VP9, VP10 and AV1. However, it should be noted that any video coding format supporting auxiliary frames as described herein is covered by the present embodiment.

According to a second aspect of the embodiment, the teachings are implemented with a computer program product comprising a computer-readable medium with computer code instructions adapted to carry out the method of the first aspect when executed by a device having processing capability.

According to a third aspect, an encoder adapted for encoding a video stream captured by a video capturing device in a video coding format, includes video coding format which supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, wherein the encoder being further adapted to:

receiving first image data captured by the video capturing device, using the first image data as image data of a first auxiliary frame, encoding the first auxiliary frame as an intra frame, encoding a first frame as inter frame referencing the first auxiliary frame, wherein motion vectors of the first frame are representing a first image transformation to be applied to the first image data.

The second and third aspects may generally have the same features and advantages as the first aspect. It is further noted that the embodiment relates to all possible combinations of features unless explicitly stated otherwise.

BRIEF DESCRIPTION OF THE DRAWINGS

The above will be better understood through the following illustrative and non-limiting detailed description of preferred embodiments, with reference to the appended drawings, where the same reference numerals will be used for similar elements, wherein.

DETAILED DESCRIPTION OF EMBODIMENTS

The present teachings will now be described more fully hereinafter with reference to the accompanying drawings, in which embodiments are shown. The systems and devices disclosed herein will be described during operation.

A new way of handling complex transformations of image data in an encoder is presented, for a video coding format that supports including an auxiliary frame in the encoded video stream. An example of such complex transformations includes transformations for (at least partly) neutralizing distortion of the image data caused by a lens of a video capturing device that captures the image data. In geometric optics, distortion is a deviation from rectilinear projection, a projection in which straight lines in a scene remain straight in an image. Such distortion is exemplified in FIG. 1 where a type of distortion called Barrel distortion is shown. The scene 102 is simplified to a grid of straight lines. When the camera 104 captures the scene, the output, or image data, 106 looks like that the grid has been mapped around a sphere (or barrel). Other types of similar distortions, caused by the lens of the video capturing device 106, include Pincushion distortion, Mustache distortion, and distortion caused by a wide-angle lens (fisheye lens) of the video capturing device. These types of distortion are often static, meaning that a first captured frame (or image) will be distorted in the same way as a later captured frame. However, some small differences in the distortion may take place due to e.g. irregularities in the functionality of the image sensor of the video capturing device 104.

Figure 1:
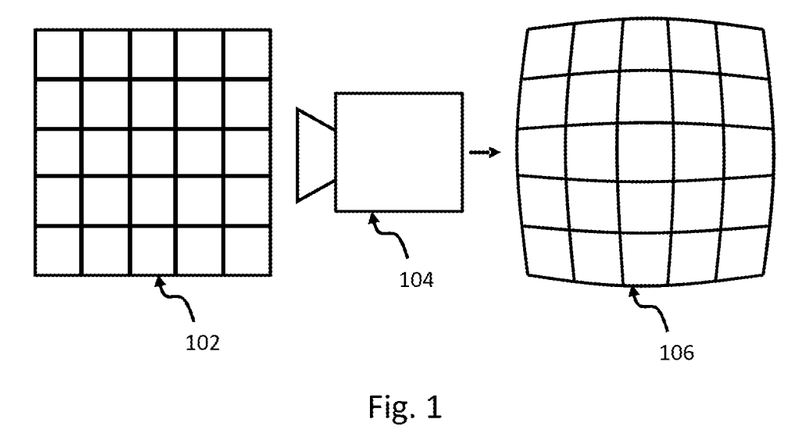
FIG. 1 schematically illustrates an example of distortion of image data caused by a lens of a video capturing device, FIG. 2 schematically illustrates motion vectors calculated to neutralize the distortion of image data of FIG. 1, FIG. 3 schematically illustrates a first embodiment of a method for encoding a video stream in a video coding format supporting auxiliary frames, FIG. 4 schematically illustrates a second embodiment of a method for encoding a video stream in a video coding format supporting auxiliary frames, FIG. 5 schematically illustrates a third embodiment of a method for encoding a video stream in a video coding format supporting auxiliary frames, FIG. 6 schematically illustrates a fourth embodiment of a method for encoding a video stream in a video coding format supporting auxiliary frames.

In prior art, lens distortions, or other types of distortions elaborated on below, are often mitigated by special hardware which transforms the distorted image data 106 back to something similar to the captured scene, before the encoding process starts. This way is not only resource intensive, but also may result in that parts of the captured scene is lost.

Figure 2:
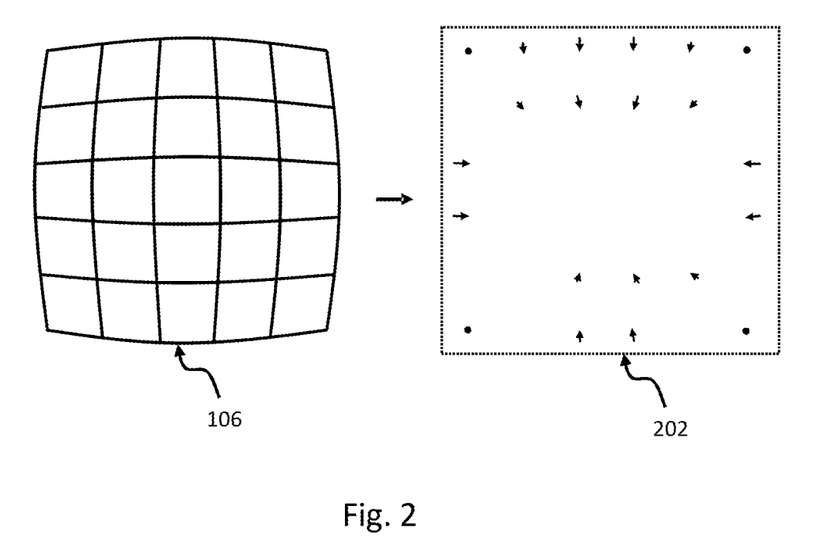

FIG. 2 shows by way of example a mapping scheme 202 between the distorted image data 106 and the original scene 102. The length and direction of an arrow in the mapping scheme 202 represent how the pixel/macroblock at the origin of the arrow should be moved to neutralize the distortion caused by the lens of the video capturing device 104. It should be noted that the mapping scheme 202 in FIG. 2 is not complete.

Figure 3:
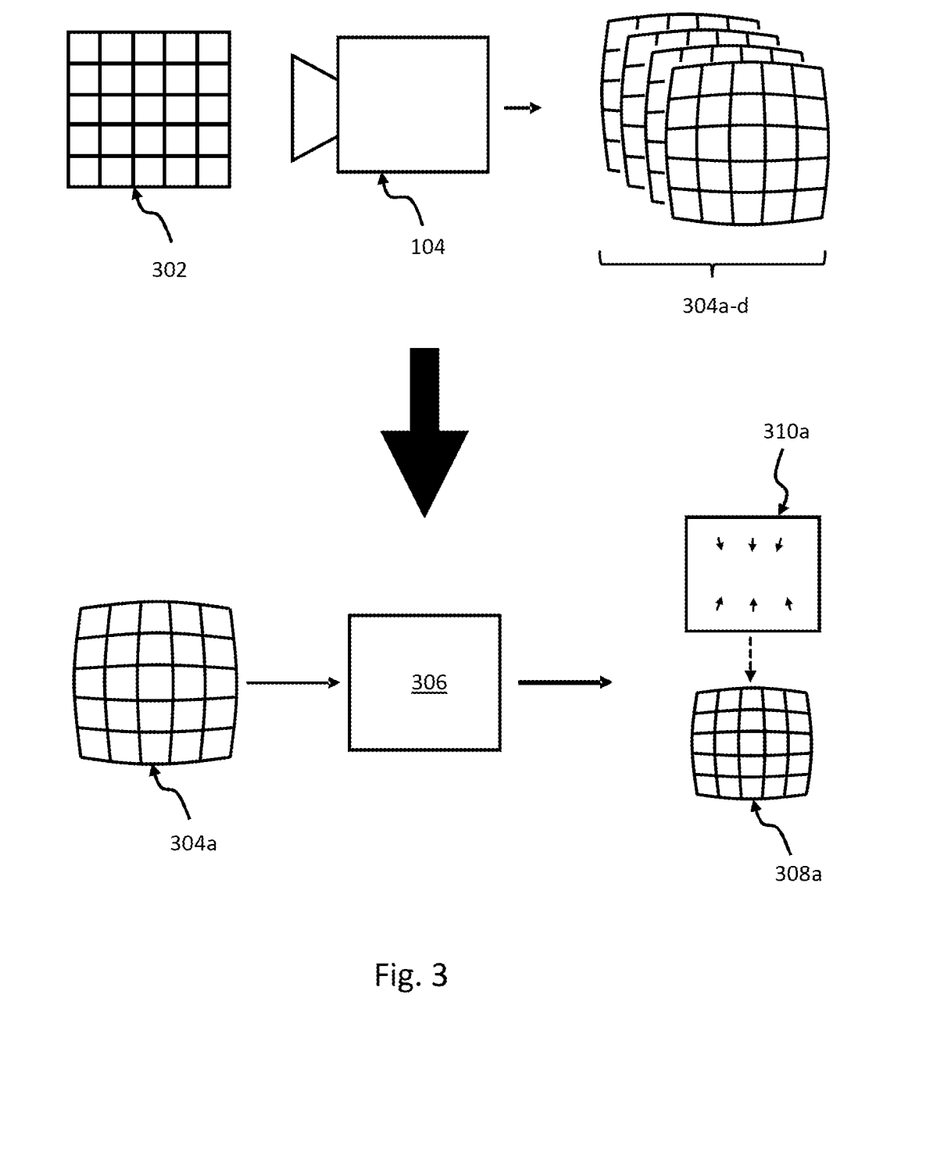
Figure 4:
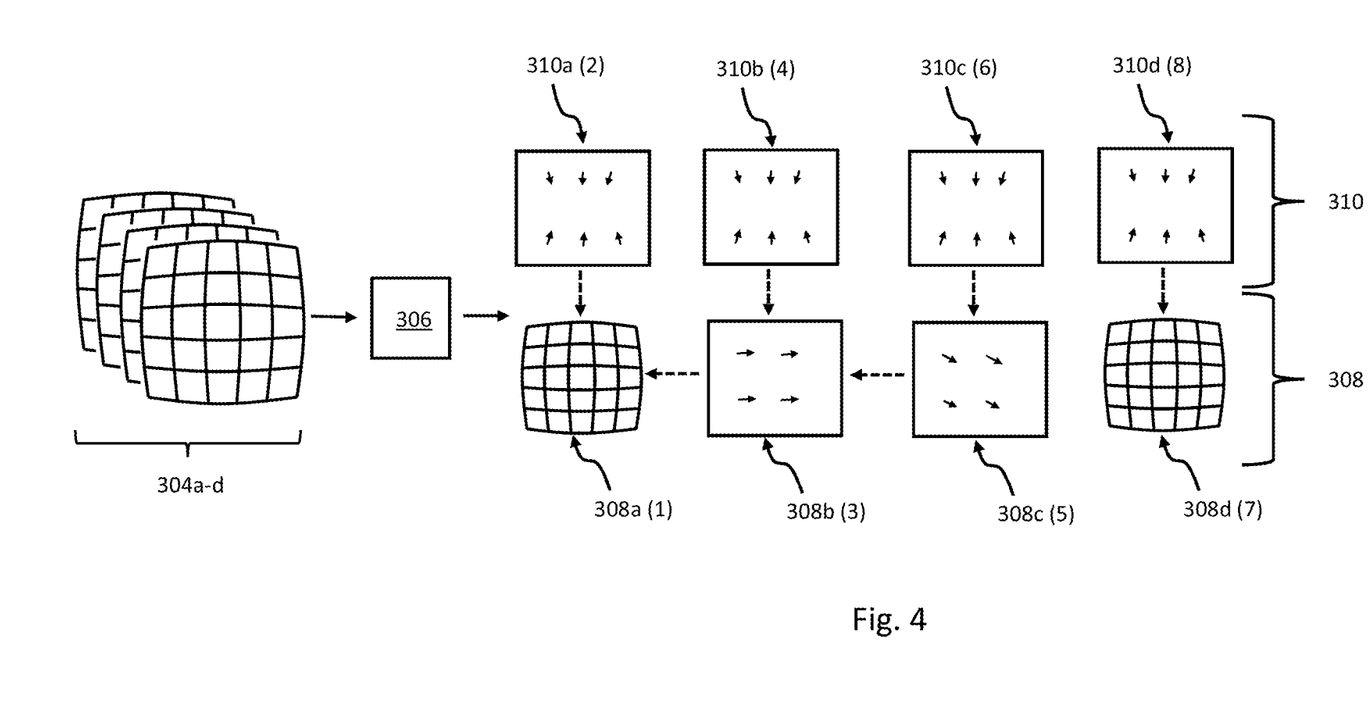

FIG. 3-4 will exemplify embodiments of a method for encoding a video stream in a video coding format which supports including an auxiliary frame in the encoded video stream, for a camera system which distorts the captured scene according to the example of FIG. 1, i.e. barrel distortion. This example can easily be transferred to other type of lens distortions.

FIG. 3 shows a scene 302 captured by a video capturing device 104 which results in a video stream 304a-d wherein the captured image data of the video stream 304a-d have been subjected to barrel distortion due to the lens of the video capturing device. The lower part of FIG. 3 shows the encoding of a first image data (or frame, image etc.) 304a captured by the video capturing device 104 wherein barrel distortion correction (BDC) is made according to the present embodiment.

The encoder 306 receives the first image data 304a. The first image data 304a is used as image data of a first auxiliary frame 308a which is then encoded as an intra frame. The encoder also encodes a first frame 310a referencing the first auxiliary frame 308a. As described above, the image data of the first auxiliary frame 308a (i.e. the first image data 304a) will be complementing the data of the first frame 310a when the first frame 310a later is decoded. The first frame 310a is encoded as an inter frame referencing the auxiliary frame 308a. Motion vectors (schematically illustrated by the arrows in the first frame 310a of FIG. 3) of the first frame 310a are determined by using information regarding the image transformation (image transform, image transformation equation, etc.) that should be applied to the first image data 304a (in this case barrel distortion correction) to make the first image data 304a appear as desired, wherein the motion vectors 310 are representing the image transformation.

The motion vectors of the first frame 310a (second, third frame etc.) can be determined in many ways. According to some embodiments, the motion vectors are determined by determining a first image transformation to be applied to the first image data (in this case the inverted barrel distortion), and calculating motion vectors representing the first image transformation by sampling the first image transformation according to a determined macroblock size for the motion vectors of the first frame. For example, if the image transformation results in that a certain pixel should be moved 5 pixels to the right and 3 pixels down, the actual movement of this pixel is determined based on the sampling size (macroblock size) and the transformation for neighbouring pixels. According to other embodiments, a plurality of macroblock sizes is used for the sampling, wherein the macroblock size used for a specific area of the mapping scheme depends on how the image transformation looks like for that corresponding area. For example, the macroblock size can be varied from 16×16 down to 4×4. This embodiment will lower the cost in bit rate for the motion vectors, and may in an efficient way use most bits for local areas of the image transformation which are highly irregular, and use less bits for local areas where the transformation is more uniform.

To further lower the cost in bitrate for the motion vectors, the sampling could be made sparser (increase the size of the macroblock), such that it is left to the decoder to interpolate between received motion vectors to calculate motion vectors for macroblocks of a smaller size, to achieve a smoother transformation of the image data in the auxiliary frames. This could be achieved by including an interpolation parameter in the encoded bit stream, or setting a flag in a header of an inter frame etc.

According to other embodiments, the sampling of the image transformation to achieve motion vectors is made based on the level of details in the corresponding area of the image data in the auxiliary frame. For example, for a local area in the image data comprising a high degree of straight lines (can be determined using any suitable edge detection algorithm), a denser sampling (smaller macroblock size) may be needed for the corresponding area in the image transform. For areas with a lower degree of lines, a sparser sampling may be employed.

The sampling may be done for example by nearest neighbour sampling, bilinear sampling or bicubic sampling. These two embodiments may be advantageous in the case where the distortion of the image data captured by the video capturing device 104 may change during time, and provide a flexible way of calculating the motion vectors.

According to some embodiments, the motion vectors of the first frame 310a are pre-calculated. In the example of FIG. 3, the barrel distortion caused by the lens of the video recording device 104 may be known beforehand. In this case, motion vectors neutralizing the barrel distortion (thus providing BDC) may be pre-calculated and for example stored in memory accessible by the encoder. In this case, the step of encoding the first frame 310a comprises retrieving the pre-calculated motion vectors and using these as motion vectors of the first frame 310a. This embodiment provides a less complex encoding process which also may be time efficient.

As described above, an advantage of the present teachings is that a standard decoder that supports the video coding format used by the encoder (e.g. H.265) can decode a video stream according to FIG. 3. The decoder will apply the motion vectors of the first frame 310a to the distorted image data of the first auxiliary frame 308a to achieve BDC of the image data of the first auxiliary frame 308a and thus end up with something similar to the captured scene 302. Moreover, since the image data of the first auxiliary frame 308 is the raw image data captured by the video capturing device 104, this data can later be retrieved by a custom decoder if needed. This may be advantageous for example in a surveillance situation where parts of the raw image data captured by the video capturing device 104 is removed during the BDC, but where these removed parts potentially could include information of interest.

FIG. 4 shows an extension of the method described in FIG. 3, where all four captured image frames (image data) of the video stream 304a-d are encoded by the encoder 306. In FIG. 4, the first image data 304a is encoded as described in FIG. 3 to achieve an encoded first frame 310a and an encoded first auxiliary frame 308a. After encoding the first image data 304a, the encoder 306 receives second image data 304b captured by the video capturing device 104. The second auxiliary frame 308b is advantageously encoded as an inter frame (e.g. P-frame) referencing the first auxiliary frame 308a to take advantage of temporal redundant information in previous image frames, in this case the first auxiliary frame 308a. The encoding of the second auxiliary frame is thus according to some embodiments made based on comparisons between the second image data 304b and the first image data 304a. In FIG. 4, the encoded second auxiliary frame 308b is schematically represented by motions vectors but image data describing image content not present in the image data 304a of the first auxiliary frame but present in the second image data 304b and/or predictions error (also referred to residual values) may of course also be included in the encoded second auxiliary frame 308b.

According to other embodiments, also the second auxiliary frame 308b is encoded as an I-frame.

The encoder 306 continues by encoding a second frame 310b as an inter frame referencing the second auxiliary frame 308b, wherein motion vectors of the second frame 310b are representing a second image transformation to be applied to the second image data 304b. As described above, the image transformation to be applied to the second image data 304b may be the same as the image transformation to be applied to the first image data 304a, for example BDC. In this case, the step of encoding the second frame 310b may comprise copying the first frame 310a and referencing the copy of the first frame to the second auxiliary frame 308b. This may provide an efficient and low complexity encoding process. According to other embodiments, the motion vectors of the second frame 310b are pre-calculated as described above, and the step of encoding the second frame 310b comprises retrieving the pre-calculated motion vectors. The motion vectors may of course be separately calculated (as described above) also for the second frame 310b, which will be further described below in conjunction with FIG. 6.

In FIG. 3, the above encoding process for the second image data 304b is iterated for a third image data 304c. As described above, the number of inter frame encoded auxiliary frames following an intra encoded auxiliary frame may be determined by a setting for Group of Pictures length (GOP-length) for the encoder 306. In this case, the GOP-length defines that the distance between two full images (I-frames, intra frames) is 2.

For the fourth image data 304d, the encoding process described above in conjunction with FIG. 3 is yet again employed, thus leading to an intra frame encoded fourth auxiliary frame 308d.

In FIG. 4, the numbers within the parentheses describe the order in which encoded auxiliary frames 308 (AF) and "regular" frames 310 (RF) are included in an encoded video stream. For the example of FIG. 4, the order is: AF1 308a, RF1 310a, AF2 308b, RF2 310b, AF3 308c, RF3 310c, AF4 308d, RF4 310d.

Figure 5:
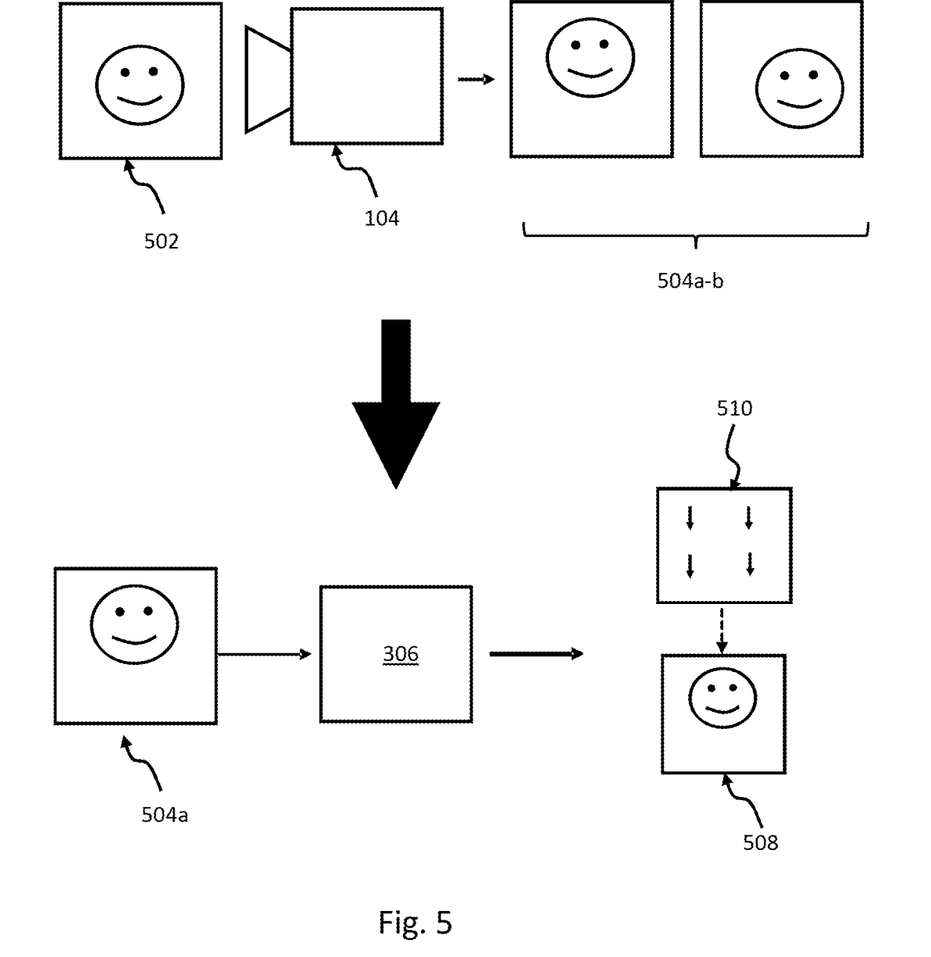
Figure 6:
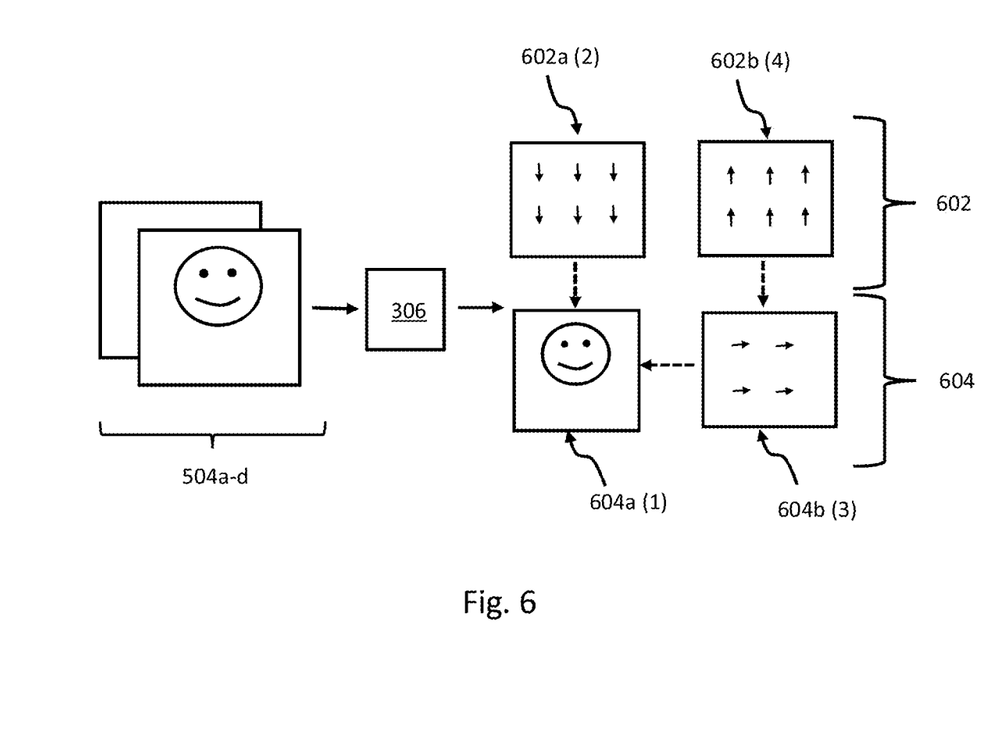

FIGS. 5-6 describes another type of image transformation that may need to be applied to image data 504a-b captured by the video capturing device 104. In the example of FIGS. 5-6, electronic image stabilization (EIS) is applied. This may be needed for example for a surveillance camera mounted in an exposed location such as on a high pole or a street sign near a busy road. In this case, the camera can be shaken by winds or passing traffic. As illustrated in the top part of FIG. 5, the subject in the scene 502 (which does not move in vertical direction) is moved in vertical direction between the first captured image data 504a and the second captured image data 504b, which may blur the video in case EIS is not applied.

In the lower part of FIG. 5, the encoding process of the first image data 504a is shown. The encoding process is no different from the one described for the first image data 304a in FIG. 3, except that the motion vectors in this case need to be calculated while encoding. The image transformation that needs to be applied to achieve EIS can be calculated using the EIS algorithm as developed by Axis Communications or any other suitable algorithm known to the skilled person. Motion vectors may then be determined by sampling the image transformation as described above.

FIG. 6 shows the encoding process performed by the encoder 306 for both captured image data 504a-b. As illustrated in FIG. 6, the motion vectors for the first image frame 602a differs from the motion vectors for the second image frame 602b. In other words, the first and second image transformation differs. The first and second image transformations relate to EIS in this case, but other image transformations such as Digital Pan Tilt Zoom (DPTZ) are equally possible. Other than this, the encoding process is similar to the one described in conjunction with FIG. 4.

The encoder 306 is thus adapted to encode the video stream 304a-d, 504a-b, as described above. The encoder 306 may be provided directly in video capturing device 104, or wired or wireless connected to the video capturing device 104 to receive the image data of the video streams 304a-d, 504 a-b. The encoder 306 may comprise, or be connected to, a memory for retrieving pre-calculated motion vectors. The encoder 306 may comprise a processing unit for calculating image transformations, and/or sample motion vectors from an image transformation. Alternatively, or additionally, the encoder may be adapted to receive image transformations and/or motion vectors from a separate calculation unit adapted to calculate/determine such image transformations and/or motion vectors. The encoder typically comprises one or several processing units (e.g. a CPU) for encoding the received image data as described above. The CPU may for example be adapted to run a software, installed from a computer-readable storage medium, with instructions adapted to carry out the encoding method of any of the above described embodiments when executed by the CPU. The encoder may further be adapted to transmit (via e.g. internet) the encoded video stream wireless or wired to a decoder adapted to decode the encoded video stream.

The systems (e.g. encoder 306) and methods disclosed hereinabove may be implemented as software, firmware, hardware or a combination thereof. In a hardware implementation, the division of tasks between functional units or components referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

It will be appreciated that a person skilled in the art can modify the above-described embodiments in many ways and still use the teachings as shown in the embodiments above. For example, the order of encoding the auxiliary frames and the frames complementing the auxiliary frames can be changed in any suitable way. For example, all auxiliary frames within a GOP may be encoded first, before including inter encoded frames referencing the auxiliary frames interlacing with the encoded auxiliary frames in the encoded video stream. Also, both an image transformation which at least partly neutralize distortion of the image data caused by a lens of the video recording device (e.g. BCD) as well as other image transformation(s) (e.g. EIS) may need to be applied to a specific image data. Thus, the teachings should not be limited to the shown embodiments but should only be defined by the appended claims. Additionally, as the skilled person understands, the shown embodiments may be combined.

The invention claimed is:

1. A method for encoding a video stream in a video coding format, including an auxiliary frame in the encoded video stream, the auxiliary frame being referenced by another frame in the encoded video stream and comprising image data complementing said another frame, the method comprising the steps of:
   receiving first image data, the first image data being raw image data as captured by a video capturing device;
   using the first image data as image data of a first auxiliary frame, wherein the first auxiliary frame is tagged as a non-display frame that is not displayed to a user;
   encoding the first auxiliary frame as an intra frame; and
   encoding a first frame as an inter frame referencing the first auxiliary frame, including:
      determining a first image transformation to be applied to the first image data; and
      calculating motion vectors representing the first image transformation by sampling the first image transformation according to a determined macroblock size for the motion vectors of the first frame, wherein data of the first frame include only the motion vectors and do not include residual values, wherein the motion vectors of the first frame are set to represent a first image transformation to be applied to the first image data.

2. The method of claim 1, further comprising the steps of:
   receiving second image data, the second image data being raw image data as captured by the video capturing device;
   encoding a second auxiliary frame as an inter frame referencing the first auxiliary frame, wherein the encoding of the second auxiliary frame is made based on comparisons between the second image data and the first image data; and
   encoding a second frame as an inter frame referencing the second auxiliary frame, wherein data of the second frame include only motion vectors and do not include residual values, wherein motion vectors of the second frame are set to represent a second image transformation to be applied to the second image data.

3. The method of claim 2, wherein the second image transformation equals the first image transformation.

4. The method of claim 2, wherein the first and second image transformation differs.

5. The method of claim 2, wherein the first and second image transformation at least partly neutralize distortion of the first and second image data caused by a lens of the video recording device.

6. The method of claim 5, wherein the distortion is one from the list of: barrel distortion, pincushion distortion, mustache distortion, and distortion caused by a wide-angle lens of the video recording device.

7. The method of claim 3, wherein the step of encoding the second frame comprises copying the first frame and referencing the copy of the first frame to the second auxiliary frame.

8. The method of claim 2, wherein the first and second image transformations relate to one from the list of: electronic image stabilization, and Digital Pan Tilt Zoom, DPTZ.

9. The method of claim 1, wherein
the first image transformation is sampled according to a determined plurality of macroblock sizes for the motion vectors of the first frame.

10. The method of claim 3, wherein the motion vectors of the first and second frame are pre-calculated, the step of encoding the first and second frame, respectively, comprises retrieving the pre-calculated motion vectors.

11. The method of claim 1, wherein the video coding format is one of the list of: High Efficiency Image File Format, Advanced Video Coding, H.264, High Efficiency Video Coding, H.265, H.266, VP9, VP10 and AV1.

12. A computer program product comprising a non-transitory computer-readable storage medium with instructions adapted to carry out the method of claim 1 when executed by a device having processing capability.

13. An encoder adapted for encoding a video stream captured by a video capturing device in a video coding format, including an auxiliary frame in the encoded video stream, the auxiliary frame being referenced by another frame in the encoded video stream and comprising image data complementing said another frame, wherein the encoder being further adapted to:
receiving first image data, the first image data being raw image data as captured by the video capturing device;
using the first image data as image data of a first auxiliary frame, wherein the first auxiliary frame is tagged as a non-display frame that is not displayed to a user;
encoding the first auxiliary frame as an intra frame; and
encoding a first frame as an inter frame referencing the first auxiliary frame, including:
determining a first image transformation to be applied to the first image data; and
calculating motion vectors representing the first image transformation by sampling the first image transformation according to a determined macroblock size for the motion vectors of the first frame, wherein data of the first frame include only the motion vectors and do not include residual values, wherein the motion vectors of the first frame are set to represent a first image transformation to be applied to the first image data.

14. The encoder of claim 13, wherein the encoder is further adapted to:
receive second image data, the second image data being raw image data as captured by the video capturing device;
encode a second auxiliary frame as an inter frame referencing the first auxiliary frame, wherein the encoding of the second auxiliary frame is made based on comparisons between the second image data and the first image data; and
encode a second frame as an inter frame referencing the second auxiliary frame, wherein data of the second frame include only motion vectors and do not include residual values, wherein motion vectors of the second frame are set to represent representing a second image transformation to be applied to the second image data.

15. The encoder of claim 14, wherein the second image transformation equals the first image transformation.

16. The encoder of claim 14, wherein the first and second image transformation differs.

17. The encoder of claim 14, wherein the first and second image transformation at least partly neutralize distortion of the first and second image data caused by a lens of the video recording device.

18. The encoder of claim 17, wherein the distortion is one from the list of: barrel distortion, pincushion distortion, mustache distortion, and distortion caused by a wide-angle lens of the video recording device.

19. The encoder of claim 15, wherein the step of encoding the second frame comprises copying the first frame and referencing the copy of the first frame to the second auxiliary frame.

20. The encoder of claim 13, wherein the first image transformation is sampled according to a determined plurality of macroblock sizes for the motion vectors of the first frame.

* * * * *